(12) United States Patent
Beil et al.

(10) Patent No.: US 11,867,107 B2
(45) Date of Patent: Jan. 9, 2024

(54) INTERNAL COMBUSTION ENGINE FOR A MOTOR VEHICLE AND MOTOR VEHICLE

(71) Applicant: Mercedes-Benz Group AG, Stuttgart (DE)

(72) Inventors: Heiko Beil, Stuttgart (DE); Rene Ernst, Leimersheim (DE); Siegfried Mueller, Ingersheim (DE); Michael Heinrichsmeyer, Steinheim (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/040,516

(22) PCT Filed: Jul. 21, 2021

(86) PCT No.: PCT/EP2021/070312
§ 371 (c)(1),
(2) Date: Feb. 3, 2023

(87) PCT Pub. No.: WO2022/028885
PCT Pub. Date: Feb. 10, 2022

(65) Prior Publication Data
US 2023/0287818 A1    Sep. 14, 2023

(30) Foreign Application Priority Data
Aug. 5, 2020  (DE) .................... 10 2020 004 717.3

(51) Int. Cl.
*F01N 3/20* (2006.01)
*F01N 3/32* (2006.01)
(Continued)

(52) U.S. Cl.
CPC ......... *F01N 3/2013* (2013.01); *F01N 3/2033* (2013.01); *F01N 3/323* (2013.01);
(Continued)

(58) Field of Classification Search
CPC ...... F01N 3/2013; F01N 3/2033; F01N 3/323; F01N 2240/14; F01N 2240/16; F01N 2430/10; F02B 37/10; F02M 26/04
See application file for complete search history.

(56) References Cited

U.S. PATENT DOCUMENTS 10,801,427 B2 * 10/2020 Han ................... F02M 26/15
10,808,633 B2 * 10/2020 Han ................... B60W 20/16
(Continued)

FOREIGN PATENT DOCUMENTS

| DE | 10 2013 001 080 A1 | 7/2014 |
| DE | 10 2015 015 794 A1 | 8/2016 |
| DE | 10 2017 213 004 A1 | 1/2019 |
| DE | 10 2018 117 913 A1 | 1/2019 |
| DE | 10 2018 129 955 A1 | 5/2020 |

OTHER PUBLICATIONS

PCT/EP2021/070312, International Search Report dated Sep. 13, 2021 (Two (2) pages).

(Continued)

*Primary Examiner* — Jesse S Bogue
(74) *Attorney, Agent, or Firm* — Crowell & Moring LLP

(57) ABSTRACT

An internal combustion engine for a motor vehicle includes a drive shaft, an intake tract, an exhaust gas tract, an exhaust gas aftertreatment device disposed in the exhaust gas tract, a heating element disposed in the exhaust gas tract upstream of the exhaust gas aftertreatment device, an electrically assisted exhaust gas turbocharger, and a conduit element which is fluidically connected to the exhaust gas tract at a first connection point disposed downstream of the exhaust gas aftertreatment device and at a second connection point disposed upstream of the heating element.

10 Claims, 1 Drawing Sheet

(51) Int. Cl.
    *F02M 26/04*     (2016.01)
    *F02B 37/10*     (2006.01)

(52) U.S. Cl.
    CPC ............ *F02B 37/10* (2013.01); *F02M 26/04* (2016.02); *F01N 2240/14* (2013.01); *F01N 2240/16* (2013.01); *F01N 2430/10* (2013.01)

(56) References Cited

U.S. PATENT DOCUMENTS

| | | | | |
|---|---|---|---|---|
| 10,989,084 | B2* | 4/2021 | Laube | F01N 3/10 |
| 11,391,229 | B2* | 7/2022 | Cox | F02D 9/02 |
| 11,525,389 | B2* | 12/2022 | Tufail | F01N 3/2006 |
| 2020/0109675 | A1* | 4/2020 | Han | F01N 5/04 |

OTHER PUBLICATIONS

German-language German Office Action issued in German application No. 10 2020 004 717.3 dated Mar. 11, 2021 (Seven (7) pages).

U.S. Patent Application, "Internal Combustion Engine for a Motor Vehicle, and Motor Vehicle", filed Feb. 3, 2023, Inventor Heiko Beil et al.

German-language German Summons Hearing issued in German application No. 10 2020 004 717.3 dated Jun. 14, 2023 (Ten (10) pages).

German-language German Office Action issued in German application No. 10 2020 004 717.3 dated Mar. 10, 2023 (Nine (9) pages).

\* cited by examiner

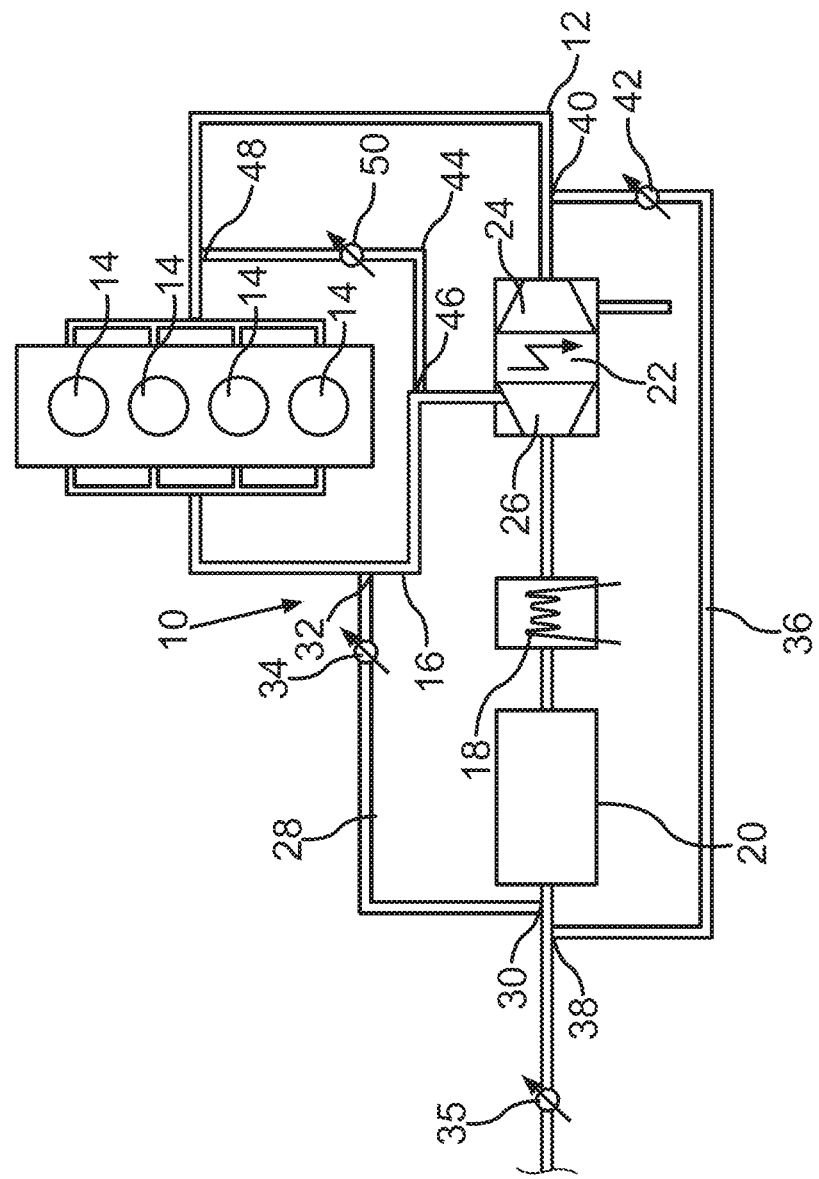

INTERNAL COMBUSTION ENGINE FOR A MOTOR VEHICLE AND MOTOR VEHICLE

BACKGROUND AND SUMMARY OF THE INVENTION

The invention relates to an internal combustion engine for a motor vehicle. The invention further relates to a motor vehicle.

DE 10 2017 213 004 A1 discloses an internal combustion engine having an internal combustion motor, a fresh gas train for feeding fresh gas to the internal combustion motor, an exhaust gas train for removing exhaust gas from the internal combustion motor, and at least one exhaust gas aftertreatment device integrated into the exhaust gas train. The internal combustion engine further comprises an electrically drivable compressor integrated into the fresh gas train or the exhaust gas train, and a heating device preceding the exhaust gas aftertreatment device or integrated therein for heating up a gas flowing through this heating device. The internal combustion engine has a control device that is formed in such a way that it operates the compressor simultaneously with the heating device in a non-operation of the internal combustion motor as required if the temperature of a component of the internal combustion engine lies below a defined threshold value.

DE 10 2018 129 955 A1 further discloses a method for pre-conditioning an exhaust gas system to remove and purify internal combustion exhaust gases of an internal combustion motor, in particular an internal combustion motor of a motor vehicle, wherein air is heated by a heating element in the exhaust gas system. A hot air flow is generated with the heated air in the exhaust gas system by a fan, wherein a first catalyst of the exhaust gas system is heated up to a minimum operating temperature by the hot air flow.

A method for operating a drive device having an internal combustion engine and having an exhaust gas system attached to the internal combustion engine, the exhaust gas system having at least one catalyst, should be taken as known from DE 10 2013 001 080 A1. A warm air flow warmed by means of a heating device is fed to the catalyst for heating in at least one operating state of the internal combustion engine, wherein the warm air flow is mixed with a cold fresh air flow upstream of the catalyst for adjusting a particular temperature.

The object of the present invention is to create an internal combustion engine and a motor vehicle, such that an exhaust gas aftertreatment device can be particularly advantageously and particularly quickly heated.

A first aspect of the invention relates to an internal combustion engine for a motor vehicle that can be driven by the internal combustion engine via a drive shaft of the internal combustion engine. The internal combustion engine has at least one combustion chamber and an intake tract that air can flow through, wherein air can be fed to the combustion chamber via the intake tract. The internal combustion engine further comprises an exhaust gas tract that can be flowed through by an exhaust gas from the combustion chamber, wherein an exhaust gas aftertreatment device is arranged in the exhaust gas tract for aftertreating the exhaust gas. At least one heating element for heating a gas flowing through the exhaust gas tract is additionally arranged in the exhaust gas tract, upstream of the exhaust gas aftertreatment device. The internal combustion engine comprises an electrically assisted exhaust gas turbocharger that has a compressor wheel arranged in the intake tract as a first rotor for compressing the air flowing through the intake tract. The electrically assisted exhaust gas turbocharger additionally has a turbine wheel arranged in the exhaust gas tract and able to be driven by the exhaust gas as a second rotor and an electric engine. At least one of the two rotors can be driven in a heating operation for heating the exhaust gas aftertreatment device by means of the electric engine, whereby air can be fed into the exhaust gas tract as a heating medium by means of the at least one rotor in the heating operation, during which combustion processes in the combustion chamber cease and the drive shaft remains still. The heating medium can be warmed by means of the heating element in the heating operation for heating the exhaust gas aftertreatment device. The heating medium is thus the or a gas which can be heated or warmed by means of the heating element, for example.

According to the invention, the internal combustion engine has at least one conduit element according to the invention so that the exhaust gas aftertreatment device can now be heated up particularly advantageously and particularly quickly, the conduit element being fluidly connected to the exhaust gas tract at a first connection point arranged downstream of the exhaust gas aftertreatment device and at a second connection point arranged upstream of the heating element. By means of the conduit element, at least a part of the heating medium can be removed from the exhaust gas tract at the first connection point, introduced into the conduit element, fed back from the first connection point to the second connection point, and re-introduced into the exhaust gas tract at the second connection point. The internal combustion engine additionally has a valve train that has at least one intake valve assigned to the combustion chamber and at least one exhaust valve assigned to the combustion chamber. The intake valve and the exhaust valve are also described in summary as gas exchange valves. The intake valve and the exhaust valve are simultaneously opened in the heating operation, whereby the heating medium can be fed from the intake tract, through the combustion chamber, and thus via the gas exchange valves, into the exhaust gas tract in the heating operation. In other words, as the gas valves are opened simultaneously, the intake valve releases an intake duct, while the exhaust valve simultaneously releases an exhaust duct of the internal combustion engine. The heating medium can now flow through the intake duct, and thus flow from the intake tract into the combustion chamber via the intake duct and the intake valve, and then flow through the combustion chamber, and then flow through the exhaust duct, and thus flow into the exhaust gas tract via the exhaust duct and the exhaust valve, whereby the exhaust gas can be fed or is fed from the intake tract through the combustion chamber via the gas exchange valves into the exhaust gas tract.

The motor vehicle is preferably formed as a motor car, in particular as a passenger motor car. The internal combustion engine can be formed as a reciprocating piston engine and have a motor block which comprises the combustion chamber. A fluid, typically the air, flows into the combustion chamber via the intake tract. Combustion processes take place in the combustion chamber in a fired operation. A mixture of fuel and air is burned in the respective combustion process, whereby the exhaust gas of the internal combustion engine is created. The mixture of fuel and air comprises the previously stated air flowing through the intake tract and a fuel that is in particular fluid which is brought into, in particular directly injected into, the combustion chamber.

The exhaust gas aftertreatment device for aftertreating the exhaust gas is in particular arranged in the exhaust gas tract, which can in particular also be described as an exhaust gas system. In other words, the exhaust gas aftertreatment device serves as an exhaust gas purification, in particular by means of at least one catalyst and/or at least one filter, e.g., a particle filter. Pollutants present in the exhaust gas, e.g., carbon monoxide, nitrogen monoxide, nitrogen dioxide and/or unburned hydrocarbons are converted into harmless materials by means of at least one chemical reaction by means of the catalyst. The catalyst can thus be formed as a three-way catalyst. The catalyst is in particular understood as a component that particularly reduces an activation energy of the chemical reaction, whereby the speed at which the chemical reaction takes place is particularly fast. The activation energy is in particular a quantity of energy required to start the chemical reaction. The reaction speed is in particular a speed at which the chemical reaction takes place. A component that withholds solids from a gas stream or liquid stream is in particular described as a filter. Solids or pollutants described in particular as particles or soot can thus be filtered out of the exhaust gas.

In order to enable a particularly good purification of the exhaust gas of the internal combustion engine, it is advantageous that the exhaust gas aftertreatment device, in particular the catalyst, has a minimum temperature that can in particular be described as a conversion temperature or light-off temperature or onset temperature. For this purpose, in particular in the event of a cold start, it is required to heat up the exhaust gas aftertreatment device. A cold start is in particular understood as a start-up, a start, a running or an activation of the internal combustion engine at a temperature of the internal combustion engine which corresponds approximately to the environmental temperature. When the internal combustion engine starts, the internal combustion engine is brought from a state in which combustion processes cease in the combustion chamber and the drive shaft remains still, which is also described as an engine at a standstill, into an active state, which is in particular described as a fired operation. The exhaust gas aftertreatment device is heated up by means of the exhaust gas after the cold start. Particularly in the case of vehicles having a combination of an internal combustion motor and electric drive, it becomes particularly difficult to heat up the exhaust gas tract or keep it warm using the exhaust gas, as a mass flow of the exhaust gas can be very low or not present in some operating states. An electric journey of the motor vehicle, wherein the motor vehicle is at least partially driven by the electric engine during the electric journey is particularly described as electric drive.

The heating element arranged in the exhaust gas tract upstream of the exhaust gas aftertreatment device can particularly accelerate the heating up of the exhaust gas aftertreatment device, in particular after a cold start. The heating element is formed in such a way that it heats the gas flowing through or around the heating element, e.g., the exhaust gas. The gas is the exhaust gas in a normal operation and/or during the cold start of the internal combustion engine. In the heating operation of the internal combustion engine, which is different to the normal operation, the gas is the air which is warmed by means of the heating element, and which is used as a heating medium for warming or heating the exhaust gas aftertreatment device.

The conduit element according to the invention and the valve train according to the invention, which can in particular be formed as a variable or as a fully variable valve train, are provided in order to enable a particularly advantageous and fast heating of the exhaust gas aftertreatment device. A variable or fully variable valve train is understood as a valve train in which a valve lift or an opening duration, in particular an opening time and/or a closing time of the intake valve and/or of the exhaust valve can be variably adjusted or changed. This can particularly occur in or during the normal operation and/or in or during the heating operation. The intake valve and the exhaust valve are simultaneously partially opened in the heating operation, whereby the heating medium can be fed from the intake tract, through the combustion chamber into the exhaust gas tract to the heating element, for example by means of the electric or electrically assisted exhaust gas turbocharger, and/or the heating medium can be fed into the exhaust gas tract and circulate here, in particular via the conduit element. At least one of the two rotors is thus driven by the electric engine using electrical energy, which can in particular be taken from a power supply device described as an on-board power supply. At least a part of the heating medium heated by the heating element can be fed back to the heating element and the exhaust gas aftertreatment device again by means of the conduit element after flowing through the exhaust gas aftertreatment device, whereby a re-circulation circuit is created. In this way, not only the exhaust gas aftertreatment device is heated, but also further parts of the exhaust gas tract. A particularly low temperature gradient is thus present between the exhaust gas aftertreatment device and its surrounding components of the exhaust gas tract, whereby particularly little heat is transported away from the exhaust gas aftertreatment device to the surrounding components of the exhaust gas tract. In other words, a heat loss of the exhaust gas aftertreatment device is particularly low. Heating and warming up of the exhaust gas aftertreatment device can thus be configured particularly efficiently. The heating medium can additionally be brought up to a particularly high temperature in a short time, whereby the exhaust gas aftertreatment device can be efficiently and effectively warmed. The re-circulation circuit can in particular be operated in the case of an engine at a standstill. A feeding of the heating medium into the re-circulation circuit can in particular occur, or at least be assisted by means of the electrically driven at least one rotor, in particular by means of the second rotor. In other words, the re-circulation circuit can be maintained by means of the electrically driven at least one rotor. A conditioning of the exhaust gas aftertreatment device is then enabled, in particular in the case of an engine at a standstill. Particularly few pollutants are thus emitted from the internal combustion engine, particularly after a cold start.

In an embodiment of the invention, a valve element is arranged in the conduit element, by means of which a quantity of the heating medium flowing through the conduit element can be adjusted. The valve element can be connected to a piece of control equipment for this purpose, which is represented by a control device, for example, or is also described as a control device. The conduit element can be only partially or entirely closed by means of the valve element.

In a further configuration of the invention, the internal combustion engine has an exhaust gas recirculation conduit which is fluidly connected to the exhaust gas tract at an extraction point arranged downstream of the turbine wheel, in particular downstream of the exhaust gas aftertreatment device. The exhaust gas recirculation conduit is additionally fluidly connected to the intake tract at an introduction point. The introduction point can be arranged in the intake tract, upstream or downstream of the compressor wheel. By means of the exhaust gas recirculation conduit, at least a part of the exhaust gas of the extraction point can be extracted from the exhaust gas tract and introduced into the exhaust gas recirculation conduit. The exhaust gas introduced into the exhaust gas recirculation conduit can flow through the exhaust gas recirculation conduit and is fed to the introduction point by means of the exhaust gas recirculation conduit and introduced into the intake tract at the introduction point, which can particularly be described as low-pressure exhaust gas recirculation. The exhaust gas can thus be fed into the combustion chamber. A portion of exhaust gas already present in the combustion chamber before the combustion process begins can keep a pollutant particularly low which can be formed in the combustion process. This can in particular be nitrogen monoxide or nitrogen dioxide, which are both generally described in particular as nitrous oxides. At least a part of the heating medium can be fed from the extraction point to the introduction point, and introduced into the intake tract at the introduction point in the heating operation, for example.

In a further embodiment, an exhaust gas recirculation valve is arranged in the exhaust gas recirculation conduit, by means of which a quantity of the exhaust gas and/or of the heating medium flowing through the exhaust gas recirculation conduit can be adjusted. For this purpose, the exhaust gas recirculation valve can be connected to the control equipment, and can be controlled, and thus operated by the control equipment. The exhaust gas recirculation conduit can be only partially or completely closed by means of the exhaust gas recirculation valve, for example.

A further embodiment is characterized in that the internal combustion engine has a recirculation conduit which is fluidly connected to the exhaust gas tract at a third connection point arranged upstream of the turbine wheel, and fluidly connected to the intake tract at a fourth connection point. The fourth connection point can preferably be arranged downstream of the compressor wheel. By means of the recirculation conduit, for example, at least a part of the exhaust gas flowing through the exhaust gas tract can be removed from the exhaust gas tract and introduced into the recirculation conduit. The exhaust gas introduced into the recirculation conduit can flow through the recirculation conduit in a first flow direction, and is thus fed from the third connection point to the fourth connection point by means of the recirculation conduit, and introduced into the intake tract at the fourth connection point, which can particularly be described as high-pressure exhaust gas recirculation. At least a part of the heating medium or the entire heating medium can be removed from the intake tract at the fourth connection point and introduced into the recirculation conduit in the heating operation. The exhaust gas introduced into the return conduit can flow through the recirculation conduit in a second flow direction against the first flow direction, and is fed from the fourth connection point to the third connection point by means of the recirculation conduit. The heating medium is fed from the intake tract into the exhaust gas tract to the heating element while circumventing the combustion chamber or all the combustion chambers of the internal combustion engine here, whereby the heating medium, and consequently the exhaust gas aftertreatment device can be particularly effectively heated.

In a further embodiment of the invention, a recirculation valve is arranged in the recirculation conduit, by means of which a quantity of the exhaust gas and/or of the heating medium that can flow through the recirculation conduit can be adjusted. For this purpose, the return valve can be connected to the control equipment and be controlled by the control equipment. The recirculation conduit can be only partially or entirely closed by means of the recirculation valve, for example.

It has finally proved particularly advantageous if the heating element has at least one electrical heating element and/or at least one burner and/or at least one electrical catalyst. The electrical heating element is in particular understood as a heating element that converts electrical current into heat. A heating element in which at least one in particular fluid or gaseous fuel is burned while forming a flame or without flame, and thus catalytically, in particular while releasing or emitting heat, is in particular described as a burner. The electrical catalyst is in particular understood as a catalyst that is or can be heated by means of an electrical heating element, wherein the electrical heating element can be fixed on a housing of the catalyst and/or connected to a catalytic or catalytically effective structure of the catalyst, for example.

A second aspect of the invention relates to a motor vehicle which has an internal combustion engine according to the invention according to the first aspect of the invention. Advantages and advantageous configurations of the first aspect of the invention should be seen as advantages and advantageous configurations of the second aspect of the invention and vice versa. The motor vehicle according to the invention is preferably formed as a motor car, in particular as a passenger motor car or heavy goods vehicle, or as a passenger bus or motorbike.

Further advantages, features and details of the invention result from the following description of preferred exemplary embodiments and with reference to the drawing. The features and combinations of features specified previously in the description and the features and combinations of features specified in the following description of the FIGURE and/or shown in the single FIGURE alone, can be used not only in the respectively specified combinations, but also in other combinations or in isolation without leaving the scope of the invention.

BRIEF DESCRIPTION OF THE DRAWING

The single FIGURE shows a schematic depiction of an internal combustion engine according to the invention.

DETAILED DESCRIPTION OF THE DRAWING

The single FIGURE schematically shows an internal combustion engine 10 for a motor vehicle, in particular for a motor car preferably formed as a passenger motor car. The motor vehicle can be driven by means of the internal combustion engine 10 here. The internal combustion engine 10 has an intake tract 12, at least one cylinder and an exhaust gas tract 16. The cylinder partially delimits a combustion chamber 14. The internal combustion engine 10 has a piston that is received in the cylinder in a translationally movable manner. The piston partially delimits the combustion chamber 14. In the exemplary embodiment depicted in the FIG., it is a four-cylinder engine that comprises exactly four combustion chambers 14.

The intake tract can be flowed through by a fluid in the form of air which is fed into the combustion chamber 14 by means of the intake tract. Combustion processes occur in the combustion chamber 14 during a fired operation of the internal combustion engine 10, from which an exhaust gas of the internal combustion engine 10 results. The exhaust gas can flow through the exhaust gas tract 12 also described as an exhaust gas system, and leave the combustion chamber 14 via the exhaust gas tract 12. At least one heating element 18 and an exhaust gas aftertreatment device 20 are arranged in the exhaust gas tract 16, wherein the heating element 18 is arranged upstream of the exhaust gas aftertreatment device 20. The exhaust gas aftertreatment device 20 comprises at least one element for purifying the exhaust gas. The element for purifying the exhaust gas can for example be formed as an oxidation catalyst, in particular a diesel oxidisation catalyst (DOC), a NOx storage catalyst (NSC), an SCR catalyst (selective catalytic reduction catalyst), a diesel particle filter (DPF) or an SCR catalyst on a diesel particle filter (SDPF).

A catalyst that removes carbon monoxide and unburned hydrocarbons from the exhaust gas by means of oxidation with remaining oxygen is in particular described as an oxidation catalyst. Oxygen molecules that have not been part of a chemical reaction in the combustion processes, and which are thus available as oxygen for further chemical reactions, are in particular described as remaining oxygen. The NOx storage catalyst (NSC) is in particular understood as a catalyst that has a storage component in which nitrous oxides are chemically bound, and thus removed from the exhaust gas. The nitrous oxides can then be released from the storage components again in an operating state of the internal combustion engine that has a lack of oxygen in the exhaust gas, and be reduced with reducing components such as unburned hydrocarbons or carbon monoxide. A catalyst in which nitrous oxides can be converted into nitrogen and water with urea from an introduced urea solution in a redox reaction is in particular described as an SCR catalyst. A diesel particle filter (DPF) is in particular understood as a filter that removes particles that can also be described as soot or fine particulates from the exhaust gas.

The internal combustion engine 10 also has an electrical, electrically assisted or electrically assistable exhaust gas turbocharger 22 that has a compressor wheel arranged in the intake tract 12 as a first rotor 24, a turbine wheel 26 arranged in the exhaust gas tract 26 as a second rotor 26 and a shaft. The first rotor 24 and the second rotor 26 are arranged on the shaft and connected to the shaft in a torque-proof manner. The first rotor 24, the second rotor 26 and the shaft are components formed separately from one another, for example, which are connected to one another in such a manner that relative rotations between the components and movements occurring in the axial direction and in the radial direction of the shaft relative to one another cease or are avoided. The first rotor 24 can be used to condense the air to be fed to the combustion chamber 14 via the intake tract 12, for example. The exhaust gas flowing from the combustion chamber 14 into the exhaust gas tract 16 is expanded by means of the second rotor 26, for example, whereby the second rotor 26 is driven by the exhaust gas. The internal combustion engine 10 further has an electric engine with which the exhaust gas turbocharger 22 can be driven using electrical energy. The electric engine can be formed in such a manner that the shaft drives the exhaust gas turbocharger 22, such that the first rotor 24 and the second rotor 26 are driven by means of the shaft. The electric engine can alternatively be formed in such a manner that the first rotor 24 and/or the second rotor 26 can be directly driven by the electric engine. This should be understood to mean that the shaft is not directly driven by the electric engine. The internal combustion engine 10 also has a drive shaft, for example formed as a crankshaft, via which the internal combustion engine can provide torques for driving the motor vehicle, in particular in the fired operation of the internal combustion engine 10. In a heating operation of the internal combustion engine 10, air is fed into the exhaust gas tract 16 as a heating medium by means of the electrically assisted exhaust gas turbocharger 22, as at least one of the two rotors 24, 26 is driven electrically by means of the electric engine. Combustion processes cease in the or in all combustion chambers 14 of the internal combustion engine during the heating operation, and the drive shaft remains still during the heating operation. The heating medium is additionally warmed by means of the heating element 18 in the heating operation, such that the exhaust gas aftertreatment device 20 is warmed or heated by means of the warmed heating medium in the heating operation.

The internal combustion engine 10 has a valve train which has at least one intake valve assigned to the combustion chamber 14, and at least one exhaust valve assigned to the combustion chamber 14 so that the internal combustion engine 10 can now heat the exhaust gas aftertreatment device 20 particularly advantageously and particularly quickly. The intake valve and the exhaust valve are opened simultaneously in the heating operation, whereby the heating medium can be fed from the intake tract 12 through the combustion chamber into the exhaust gas tract 16 in the heating operation. The heating medium is correspondingly fed from the intake tract 12 through the combustion chamber into the exhaust gas tract 16 by means of the electrically driven exhaust gas turbocharger 22, wherein at least one of the two rotors 24, 26 is driven electrically. The internal combustion engine 10 additionally has at least one conduit element 28 which is fluidly connected to the exhaust gas tract 16 at a first connection point 30 arranged downstream of the exhaust gas aftertreatment device 20 and at a second connection point 32 arranged upstream of the heating element 18, in particular upstream of the turbine wheel 26. By means of the conduit element 28, at least a part of the heating medium flowing through the exhaust gas tract 16 can be removed from the exhaust gas tract 16 at the first connection point 30, and can be fed back from the first connection point 30 to the second connection point 32, and can be re-introduced into the exhaust gas tract 16 at the second connection point 32. It is thus possible to depict the heating medium being fed back, as the heating medium is fed back from the first connection point 30 to the second connection point 32 arranged upstream in relation to the former by means of the conduit element 28 and introduced into the exhaust gas tract 16. A first recirculation circuit is created by this feeding back of the heating medium, in which or via which the heating medium can circulate between the connection points 30, 32. The first recirculation circuit can be operated by means of the electrically driven exhaust gas turbocharger 22, particularly in a state described as an engine at a standstill. The exhaust gas aftertreatment device 20 can thus already be heated in the case of an engine at a standstill, and can thus be particularly advantageously conditioned. The internal combustion engine 10 thus has a particularly low emission of pollutants. The term "engine at a standstill" is understood as no combustion processes occurring in the internal combustion engine 10 and the output shaft remaining still.

A valve element 34 is arranged in the conduit element 28, by means of which a quantity of the heating medium flowing through the conduit element 28 can be adjusted. For this purpose, the valve element 28 can be connected to a piece of control equipment, which is represented by a control device, for example.

A mass flow of the exhaust gas and/or the heating medium leaving the internal combustion engine 10 can be reduced or suppressed or accumulated by means of an exhaust gas valve element 35 which is arranged in the exhaust gas tract 16 downstream of the first connection point 30 and can, for example, be formed as an exhaust gas flap. The exhaust gas valve element 35 can be connected to a piece of control equipment which is, for example, a control device and can actuate, and thus operate, in particular by open-loop or closed-loop control, the exhaust gas valve element 35, in order to adjust a defined mass flow. By an at least partial closure of the exhaust gas tract 16 by means of the exhaust gas valve element 35, it can be ensured that a particularly large quantity of the heating medium flows through the re-circulation circuit, i.e., circulates via or along the re-circulation circuit. The re-circulation circuit comprises the conduit element 28 here, such that the heating medium flowing through the re-circulation circuit flows through the conduit element 28, and thus circulates via the conduit element 28. The exhaust gas aftertreatment device 20 can thus be heated particularly quickly and effectively via this circulation or re-circulation.

The internal combustion engine 10 has an exhaust gas recirculation conduit 36. The exhaust gas recirculation conduit 36 is fluidly connected to the exhaust gas tract 16 at an extraction point 38 arranged downstream of the exhaust gas aftertreatment device 20. The exhaust gas recirculation conduit 36 is further fluidly connected to the intake tract 12 at an introduction point 40. By means of the exhaust gas recirculation conduit 36, in particular during the fired operation, at least a part of the exhaust gas flowing through the exhaust gas tract 16 can be fed from the removal point 38 to the introduction point 40, and can be introduced into the intake tract 12 at the introduction point 40. The introduction point is arranged in the intake tract downstream of the first rotor 24, but can alternatively be arranged upstream of the first rotor 24, which is not depicted in the FIG. At least a part of the heating medium can be fed from the extraction point 38 to the introduction point 40 and introduced into the intake tract 12 at the introduction point 40 in the heating operation. A second re-circulation circuit of the heating medium can thus be represented in the heating operation via the exhaust gas recirculation conduit 36. The feeding of the heating medium occurs via the electrically driven first rotor 24 and/or the electrically driven second rotor 26 of the exhaust gas turbocharger 22. The second re-circulation circuit can be operated independently of the first re-circulation circuit or together with the first re-circulation circuit. An exhaust gas recirculation valve 42 is arranged in the exhaust gas recirculation conduit 36, by means of which a quantity of the exhaust gas and/or of the heating medium that can flow through the exhaust gas recirculation conduit 36 can be adjusted. For this purpose, the exhaust gas recirculation valve 42 can be connected to a piece of control equipment, which is represented by the control device, for example.

The internal combustion engine 10 has a recirculation conduit 44 which is fluidly connected to the exhaust gas tract at a third connection point 46 arranged upstream of the second rotor 26, and fluidly connected to the intake tract 12 at a fourth connection point 48. The fourth connection point 48 can preferably be arranged downstream of the first rotor 24. At least a part of the exhaust gas can be fed in a first flow direction from the third connection point 46 to the fourth connection point 48, and can be introduced into the intake tract 12 at the fourth connection point 48 by means of the recirculation conduit 44. In the heating operation, the heating means can be fed from the fourth connection point 48 to the third connection point 46 in a second flow direction against the first flow direction, and can be introduced into the exhaust gas tract 16 at the third connection point 46. The heating medium is fed from the intake tract to the heating element 18 by means at least of the electrically driven first rotor 24 while circumventing the combustion chamber 14 here. A recirculation valve 50 is arranged in the recirculation conduit 44, by means of which a quantity of the exhaust gas or of the heating medium able to flow through the recirculation conduit 44 can be adjusted. For this purpose, the recirculation valve 50 can be connected to a piece of control equipment, for example represented by the control device.

The heating element 18 can have an electrical heating element and/or a burner and/or a catalyst that can be heated electrically.

LIST OF REFERENCE CHARACTERS 10 internal combustion engine
12 intake tract
14 combustion chamber
16 exhaust gas tract
18 heating element
20 exhaust gas aftertreatment device
22 exhaust gas turbocharger
24 compressor wheel
26 turbine wheel
28 conduit element
30 first connection point
32 second connection point
34 valve element
35 exhaust gas valve element
36 exhaust gas recirculation conduit
38 extraction point
40 introduction point
42 exhaust gas recirculation valve
44 recirculation conduit
46 third connection point
48 fourth connection point
50 recirculation valve

The invention claimed is:

1. An internal combustion engine (10) for a motor vehicle, comprising:
    a drive shaft via which the motor vehicle is drivable by the internal combustion engine (10);
    an intake tract (12) through which air to be supplied to a combustion chamber (14) of the internal combustion engine (10) is flowable;
    an exhaust gas tract (16) through which an exhaust gas from the combustion chamber (14) is flowable;
    an exhaust gas aftertreatment device (20) disposed in the exhaust gas tract (16) for aftertreating the exhaust gas;
    a heating element (18) disposed in the exhaust gas tract (16) upstream of the exhaust gas aftertreatment device (20) for heating a gas flowing through the exhaust gas tract (16);
    an electrically assisted exhaust gas turbocharger (22) which has a compressor wheel disposed in the intake tract (12) as a first rotor (24) for compressing air flowing through the intake tract (12), a turbine wheel as a second rotor (26) which is disposed in the exhaust gas tract (16) and which is drivable by the exhaust gas, and an electric machine via which at least one of the first and second rotors (24, 26) is drivable in a heating operation for heating the exhaust gas aftertreatment device (20), wherein in the heating operation, during which combustion processes in the combustion chamber (14) do not take place and the drive shaft is at a standstill, air is conveyable as a heating medium by the at least one of the first and second rotors (24, 26) into the exhaust gas tract (16) and is warmable by the heating element (18) in the heating operation to heat the exhaust gas aftertreatment device (20);

a conduit element (28) which is fluidically connected to the exhaust gas tract (16) at a first connection point (30) disposed downstream of the exhaust gas aftertreatment device (20) and at a second connection point (32) disposed upstream of the heating element (18), wherein at least a portion of the heating medium is returnable from the first connection point (30) to the second connection point (32) and is introducible into the exhaust gas tract (16) at the second connection point (32); and a valve train that has an intake valve assigned to the combustion chamber (14) and an exhaust valve assigned to the combustion chamber (14), wherein the intake valve and the exhaust valve are simultaneously open in the heating operation such that the heating medium is fed from the intake tract (12) through the combustion chamber (14) into the exhaust gas tract (16) in the heating operation.

2. The internal combustion engine (10) according to claim 1, further comprising a valve element (34) which is disposed in the conduit element (28) and via which a quantity of the heating medium that flowable through the conduit element (28) is adjustable.

3. The internal combustion engine (10) according to claim 1, further comprising an exhaust gas recirculation conduit (36) which is fluidically connected to the exhaust gas tract (16) at an extraction point (38) disposed downstream of the exhaust gas aftertreatment device (20) and which is fluidically connected to the intake tract (12) at an introduction point (40), wherein at least a portion of the exhaust gas and/or, in the heating operation, at least a portion of the heating medium is feedable from the extraction point (38) to the introduction point (40) and is introducible into the intake tract (12) at the introduction point (40).

4. The internal combustion engine (10) according to claim 3, wherein the introduction point (40) is disposed upstream or downstream of the first rotor (24).

5. The internal combustion engine (10) according to claim 3, further comprising an exhaust gas recirculation valve (42) which is disposed in the exhaust gas recirculation conduit (36) and via which a quantity of the exhaust gas and/or the heating medium that is flowable through the exhaust gas recirculation conduit (36) is adjustable.

6. The internal combustion engine (10) according to claim 1, further comprising a recirculation conduit (44) which is fluidically connected to the exhaust gas tract (16) at a third connection point (46) disposed upstream of the second rotor (26) and is fluidically connected to the intake tract (12) at a fourth connection point (48), wherein at least a portion of the exhaust gas is feedable from the third connection point (46) to the fourth connection point (48) and is introducible into the intake tract (12) at the fourth connection point (48) and/or, wherein in the heating operation, at least a portion of the heating medium is feedable from the fourth connection point (48) to the third connection point (46) and is introducible into the exhaust gas tract (16) at the third connection point (46).

7. The internal combustion engine (10) according to claim 6, wherein the fourth connection point (48) is disposed downstream of the electrically assisted exhaust gas turbocharger (22).

8. The internal combustion engine (10) according to claim 6, further comprising a recirculation valve (50) which is disposed in the recirculation conduit (44) and via which a quantity of the exhaust gas and/or of the heating medium that is flowable through the recirculation conduit (44) is adjustable.

9. The internal combustion engine (10) according to claim 1, wherein the heating element (18) comprises an electrical heating element and/or a burner.

10. A motor vehicle, comprising:
the internal combustion engine (10) according to claim 1.

* * * * *